(12) United States Patent
Cutler et al.

(10) Patent No.: US 9,398,168 B2
(45) Date of Patent: Jul. 19, 2016

(54) SESSION BINDING USING SUBSCRIBER IDENTIFICATION

(71) Applicant: Alcatel -Lucent Canada, Inc., Ottawa (CA)

(72) Inventors: Kevin Scott Cutler, Carp (CA); Felix Katz, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 78 days.

(21) Appl. No.: 14/533,467

(22) Filed: Nov. 5, 2014

(65) Prior Publication Data

US 2015/0056950 A1    Feb. 26, 2015

Related U.S. Application Data

(63) Continuation of application No. 12/824,628, filed on Jun. 28, 2010, now Pat. No. 8,903,357.

(51) Int. Cl.
*H04M 15/00* (2006.01)
*H04W 4/24* (2009.01)
(Continued)

(52) U.S. Cl.
CPC ........... *H04M 15/66* (2013.01); *H04L 12/1403* (2013.01); *H04L 12/1407* (2013.01); *H04L 12/1425* (2013.01); *H04M 15/00* (2013.01); *H04M 15/41* (2013.01); *H04M 15/61* (2013.01); *H04M 15/62* (2013.01); *H04M 15/8228* (2013.01); *H04W 4/24* (2013.01); H04L 29/12896 (2013.01); H04L 29/12905 (2013.01); H04L 61/605 (2013.01); H04L 61/6054 (2013.01); H04W 8/26 (2013.01)

(58) Field of Classification Search
CPC ..... H04M 15/66; H04M 15/00; H04M 15/61; H04M 15/8228; H04M 15/41; H04M 15/62; H04W 4/24; H04W 8/26; H04L 12/1403; H04L 12/1407; H04L 29/12896; H04L 29/12905; H04L 12/1425; H04L 61/5054; H04L 61/605
See application file for complete search history.

(56) References Cited

U.S. PATENT DOCUMENTS 6,449,474 B1    9/2002    Mukherjee et al.
8,369,827 B2    2/2013    Cutler et al.
(Continued)

OTHER PUBLICATIONS

3GPP TS 29.213 V9.1.0 (Dec. 2009), 3rd Generation Partnership Project; Tech Specification Group Core Network and Terminals; Policy and Charging Control Signalling flows QoS parameter mapping; Release 9.

(Continued)

*Primary Examiner* — Brandon Miller
(74) *Attorney, Agent, or Firm* — Kramer & Amado, P.C.

(57) ABSTRACT

Various exemplary embodiments relate to a method and related network node and machine-readable storage medium including a policy and charging rules node (PCRN) receiving a plurality of related service requests from different devices. The PCRN may establish a Session Binding Identifier (SBI) for each message received. The SBI may include one or more subscriber IDs. Upon receipt of a message, the PCRN may compare the included subscriber IDs against information included in a subscriber database to match with a specific subscriber profile. The PCRN may use the subscriber profile to determine whether existing established sessions are associated with the same subscriber profile, and may bind the sessions together when they are associated with a common subscriber profile.

20 Claims, 7 Drawing Sheets

(51) Int. Cl.
*H04L 12/14* (2006.01)
*H04L 29/12* (2006.01)
*H04W 8/26* (2009.01)

(56) References Cited

U.S. PATENT DOCUMENTS

| | | | | |
|---|---|---|---|---|
| 2007/0189279 | A1* | 8/2007 | Thalanany | H04L 63/10 370/356 |
| 2008/0274729 | A1* | 11/2008 | Kim | H04W 28/24 455/423 |
| 2010/0281170 | A1* | 11/2010 | Rui | H04L 12/1407 709/227 |
| 2010/0291923 | A1 | 11/2010 | Zhou et al. | |
| 2013/0003529 | A1* | 1/2013 | Lopez Nieto | H04L 12/1403 370/221 |

OTHER PUBLICATIONS

ESTI TS 129 214 Universal Mobile Telecommunications System(UMTS) LTE; Policy and Charging Control over RX Reference Point, (3GPP TS 29.214 version 9.3.0 Release 9).

ETSI TS 129 212 Universal Mobile Telecommunications System (UMTS), LTE; Policy and Charging Control Over Gx Reference Point (3GPP TS 29.212 version 9.2.0 Release 9).

* cited by examiner

| | | |
|---|---|---|
| 301 | Subscriber | Joe |
| 303 | IPv4 address | 1.2.3.1 |
| 307 | IPv6 address | 3ffe:1901:4532:100:f2ee:67ce |
| 309 | IMSI | 234150999999999 |
| 311 | NAI | 0234150999999999@eutran.mnc015.mcc234.3gppnetwork.org |
| 313 | Circuit ID | d205 eth 1/1/04/01 |
| 315 | PPP ID | 127.0.0.1 |
| 317 | MSISDN 1 | 18421234567 |
| 319 | MSISDN 2 | 12152249060 |
| 321 | ... | |

*FIG. 3*

SESSION BINDING USING SUBSCRIBER IDENTIFICATION

CROSS-REFERENCE TO RELATED APPLICATION

This application is a continuation of co-pending application Ser. No. 12/824,628, filed on Jun. 28, 2010, the entire disclosure of which is hereby incorporated herein of all purposes.

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other, for example describing the Policy and Charging Rules Function (PCRF), Policy and Charging Enforcement Function (PCEF), and Bearer Binding and Event Reporting Function (BBERF) of the EPC. The 3GPP further provides some guidance as to how these elements interact in order to provide reliable data services and charge subscribers for use thereof.

For example, some disclosures by the 3GPP provide some guidance on handling multiple messages from different sources and dynamic session management. Such disclosures, however, assume that each messages received always contain all same information contents, with information used to bind related messages. However, the system may not always encounter such happenstance, as real-world applications allow different messages to contain different information in their contents.

In view of the foregoing, it would be desirable to provide a method for handling the binding of related messages. In particular, it would be desirable to provide a system that may receive multiple related messages and bind them in a PCRF.

SUMMARY

In light of the present need for a method for handling and binding multiple related messages, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Policy and Charging Rules Node (PCRN) to associate at least two messages received from a plurality of devices. The method may include steps of receiving a first message from a first device, the first message containing a first subscriber identifier (ID) associated with a first subscriber profile, receiving a second message from a second device, the second message containing a second subscriber ID associated with a second subscriber profile, and determining whether the first subscriber ID of the first message and the second subscriber ID of the second message are associated with the same subscriber profile.

Various embodiments may also relate to a message-handling system to associate messages. The system may include a Policy and Charging Rules Node (PCRN) that receives at least two messages from a plurality of devices. The system may also include a first device of the plurality of devices that forwards a first message containing a first subscriber identifier (ID) associated with a first subscriber profile to the PCRN and a second device of the plurality of devices that forwards a second message containing a second subscriber ID associated with a second subscriber profile to the PCRN. The PCRN of the system may create a first session for the first message and determine whether the first subscriber ID of the first message and second subscriber ID of the second message are associated with the same subscriber profile.

Various embodiments may also relate to a machine-readable storage medium encoded with instructions for a Policy and Charging Rules Node (PCRN) to associate at least two messages received from a plurality of devices. The machine-readable storage medium may include instructions for receiving a first message from a first device, the first message containing a first subscriber identifier (ID) associated with a first subscriber profile and instructions for receiving a second message from a second device, the second message containing a second subscriber ID associated with a second subscriber profile. The machine-readable storage medium may also include instructions for determining whether the first subscriber ID of the first message and the second subscriber ID of the second message are associated with the same subscriber profile.

It should be apparent that, in this manner, various exemplary embodiments enable dynamic binding of multiple messages with different forms of subscriber identification. Particularly, by referring to a subscriber profile, the PCRF may bind messages that may refer to the same actual subscriber when using different types of subscriber IDs.

BRIEF DESCRIPTION OF THE DRAWINGS

In order to better understand various exemplary embodiments, reference is made to the accompanying drawings, wherein:

FIG. 3 illustrates an exemplary subscriber profile including a plurality of subscriber identification values;

DETAILED DESCRIPTION

Figure 1:
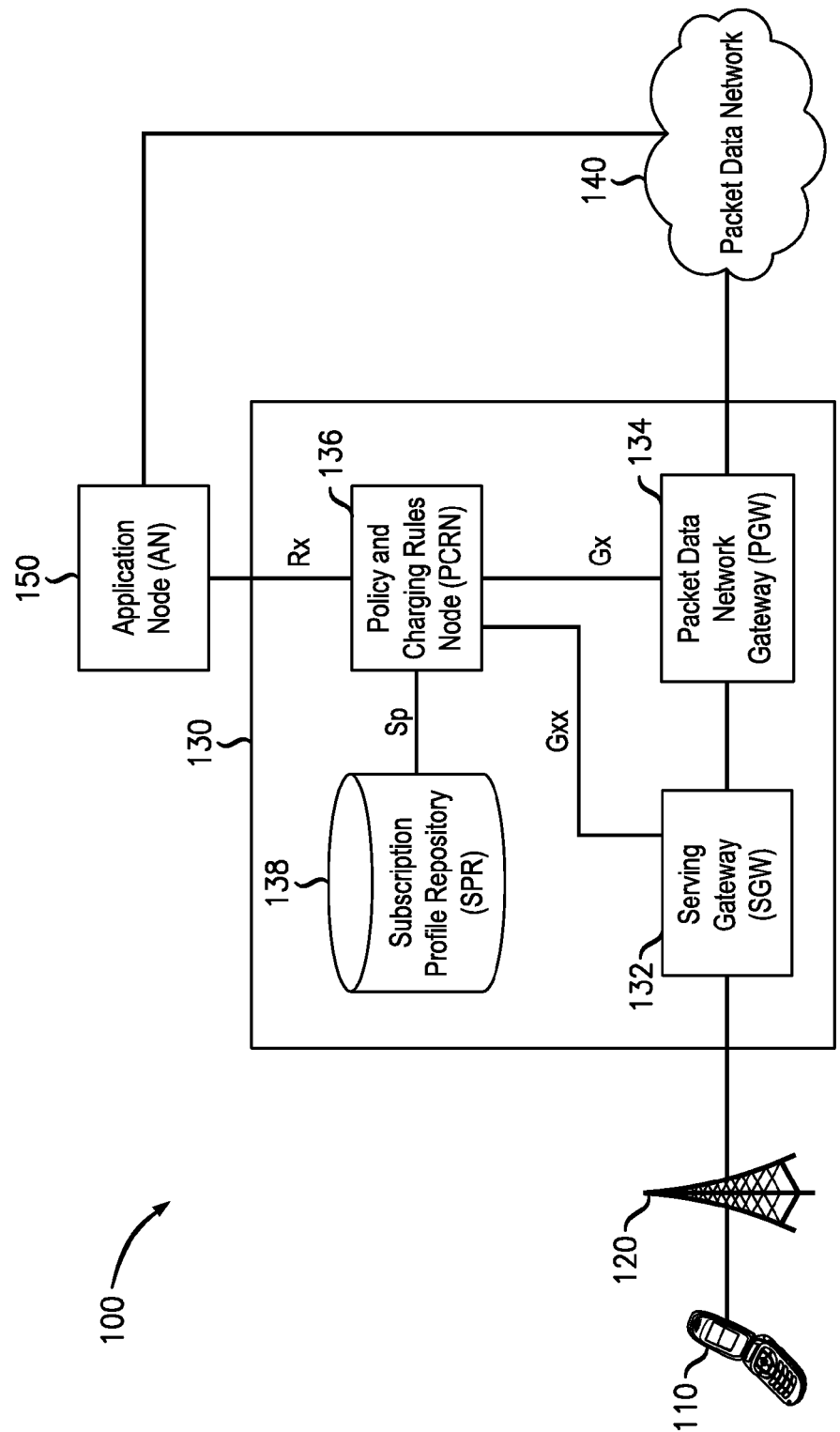
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. In other embodiments, the SPR 138 may be a device separate from the EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
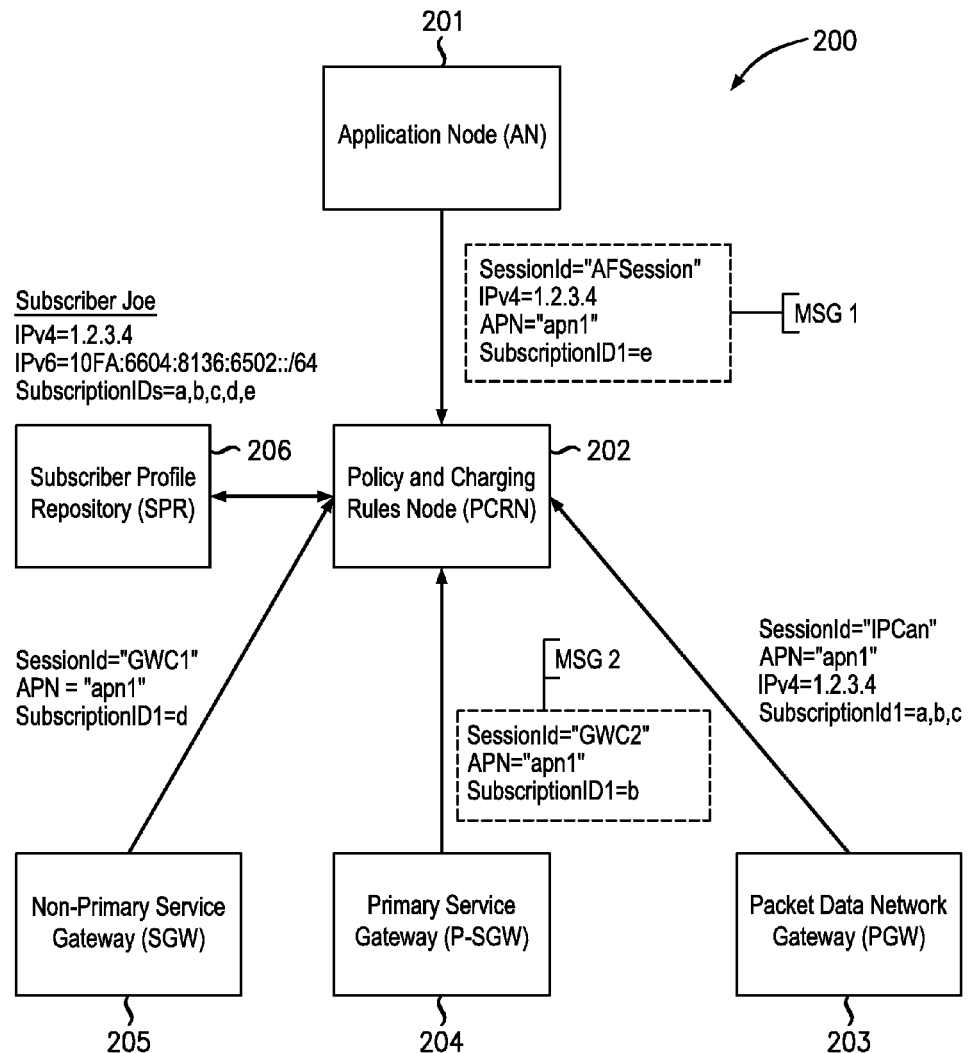
FIG. 2 illustrates an exemplary network for a PCRN receiving multiple related messages from a plurality of sources.

FIG. 2 illustrates an exemplary communications network, with a PCRN receiving multiple messages from a plurality of devices. System 200 is similar to system 100, with application node (AN) 201, policy and charging rules node (PCRN) 202, packet data network gateway (PGW) 203, primary service gateway (P-SGW) 204, and non-primary service gateway (SGW) 205 and subscriber profile repository (SPR) 206 corresponding to AN 150, PCRN 136, PGW 134, and SPR 138, respectively.

In system 200, multiple related messages may be sent through multiple devices, such as AN 201, PGW 203, P-SGW 204, and SGW 205, with each message eventually being sent to the PCRN 202. PCRN 202 may then initiate sessions based on the message and take information from each message to determine whether the received message relates to any other session the PCRN 202 established or message the PCRN 202 received. PCRN 202 may then bind any related messages together, which may include related messages sharing a common established session.

For example, AN 201 may send a message (MSG1) to the PCRN 202 with information that includes a subscription identifier (ID), such as a phone number. As will be discussed in further detail below in relation to FIG. 3, the subscription ID may be any identifier associated with a specific subscriber in a subscriber database (e.g., SPR 206). For example, the subscriber ID may be an International Mobile Subscriber Identity (IMSI), a Network Access Identifier (NAI), a circuit ID, a Point-to-Point Protocol ID (PPP ID), or a Mobile Subscriber ISDN Number (MSISDN). Similar messages may also include network address information, such as an IPv4 address and/or an IPv6 prefix. PCRN 202 may then establish an application (Rx) session and, in some embodiments, use the information included in MSG1 to determine if the PCRN 202 previously received any related messages or established any related sessions. This may enable the PCRN 202 to bind multiple messages related to the same subscriber and enable related established sessions to be bound.

PCRN 202 may determine if MSG1 is related to previously received or stored information by, for example, querying the SPR 206 via the Sp interface. In some embodiments, the PCRN 202 may construct a Session Binding Identifier (SBI) for each message received. PCRN 202 may then compare the attributes included in the constructed SBI with information in various subscriber profiles stored in the SPR 206. The SBI may include among its plurality of attributes, any and all information included in a subscriber profile stored in the SPR 206, including, for example, an IPv4 address, IPv6 prefix, and at least one subscription ID. However, in some embodiments, a message's SBI may only include the information that was included within the particular message. In system 200, for example, the SBI of MSG1 sent from the AN 201 to the PCRN 202 may only include the session identifier (session id), IPv4 address, APN (access point name), and subscription ID ("e," which may be, for example, a phone number), but the SBI of MSG1 does not contain, for example, an IPv6 prefix or other subscriber IDs, such as subscription IDs "a," "b," "c," or "d."

In some embodiments, the PCRN 202 may subsequently receive another message from another device. In the system 200, for example, the P-SGW 204 may send a second message (MSG2) to PCRN 202. The SBI of the second message, in contrast to the SBI of MSG1, contains a matching APN, a different session identifier, and a different subscriber ID ("b," which may be, for example, an IMSI). If the PCRN 202 solely compares the SBIs of the two messages, the PCRN 202 may not successfully determine that the two messages are related, as the information included in the SBIs of MSG1 and MSG2 do not explicitly match each other (e.g., no common subscriber IDs are shared). In fact, the only information in the two SBIs that match may be, for example, the APN. In some embodiments, the matching APN may not indicate that two messages are related, while a mis-matched APN may demonstrate that the two messages are not related.

When the PCRN 202, however, refers to the subscriber profiles stored in the SPR 206, the PCRN 202 may successfully determine that the MSG1 and the MSG2 include information referring to the same subscriber profile (e.g., both subscriber IDs "a" and "b" refer to subscriber "Joe") and therefore refer to the same subscriber. In some embodiments, such a match of the SBIs may indicate that their respective sessions should be bound and handled together. This may include, for example, binding the application (Rx) session used by the MSG1 with the gateway (Gx) session used by the MSG2. In other embodiments, other sessions may be bound, such as when the PCRN 202 receives a message from PGW 203 to establish an IP-CAN session.

Referring now to FIG. 3, an exemplary subscriber profile including a plurality of subscriber identification entries is illustrated. Subscriber entry 300 may act as a single record for all information associated with a single, actual subscriber collected and stored by various devices in a communications system, such as communications system 100. Such information may include an actual subscriber field 301, an IPv4 address 303, an IPv6 address (or prefix) 307, and a series of subscriber identifiers (subscriber IDs) 309-321, such as an International Mobile Subscriber Identity (IMSI) 309, a Network Access Identifier (NAI) 311, a Circuit ID 313, a Point-to-Point Protocol (PPP) ID 315, a Mobile Subscriber ISDN Numbers (MSISDN) 317-319, and additional subscriber identifiers 321. Additional subscriber identifiers 321 may include subscriber record information, such as, for example, address, phone number, and credit card number. In some embodiments, at least one of the subscriber IDs 309-321 may contain a value. The actual values for the subscriber record 300 may be stored in value column 330.

Subscriber entry 300 may be a composite subscriber record created from one or more service requests by a single actual subscriber over a period of time. This may include, for example, subscriber IDs included from messages received from the AN 201, PGW 203, P-SGW 204, and SGW 205. For example, in system 200, the PCRN 202 may receive multiple messages from devices 201-205, each with different subscription IDs a-e. As each subscription ID is associated with the same subscriber profile, the subscriber profile includes at least subscription IDs a-e. In some embodiments, the subscriber profile 300 may contain multiple IPv4 and/or IPv6 addresses (not shown). Each IPv4 address 303, IPv6 prefix 305, and subscriber ID 309-321 may be associated with an actual subscriber 301 in a given message. In some embodiments, a message may contain subscriber profile information, including the actual subscriber 301 and values for some of the fields 303-321, including at least one subscriber ID 309-321. Upon receipt, a device such as the PCRN 202 or may forward the additional values to the SPR 206.

Subscriber IDs 309-321 may be addresses or other identification information associated with the actual subscriber 301. In some embodiments, the subscriber ID 309-321 may be based on the type of connection. For example, the IMSI 309 or the MSISDNs 317-319 may be identifiers associated with a single subscriber using a wireless connection over a mobile connection to a GSM or UMTS network. Likewise, the Network Access Identifier (NAI) 311 may be assigned to the actual subscriber 301 is using a wireless connection over a mobile connection to a eHPRD (Evolved High Packet Rate Data) network. Similarly, the circuit ID or the PPP ID may be associated with the actual subscriber 301 when establishing a wireline connection.

In an exemplary embodiment, the PCRN 202, upon receipt of a message, may compare one of the subscriber ID values included in the message with values in the value column 330, including one or more subscriber IDs 309-321. PCRN 202 may compare the selected subscriber ID value with values in one or more subscriber profiles. In some embodiments, the session establishment request may be rejected when the included value for the selected subscriber ID is not found in any subscriber profile. In other embodiments, when the included value for the selected subscriber ID is not found in any subscriber profile, the PCRN 202 may create a new subscriber profile and establish a new session, as will be discussed below in relation to FIG. 4. This may occur, for example, with emergency calls, as a user may need to make an emergency call over a foreign network. While the session establishment may otherwise be rejected if no matching subscriber profile is available, the session may be established once identified as an emergency (for example, by identifying the calling number as "911"). In other embodiments, the PCRN 202 may select an additional subscriber ID value from the message and, when the PCRN 202 finds a matching value in a matching subscriber profile, add the first subscriber ID value to the correlated field in the matching subscriber profile.

Figure 4:
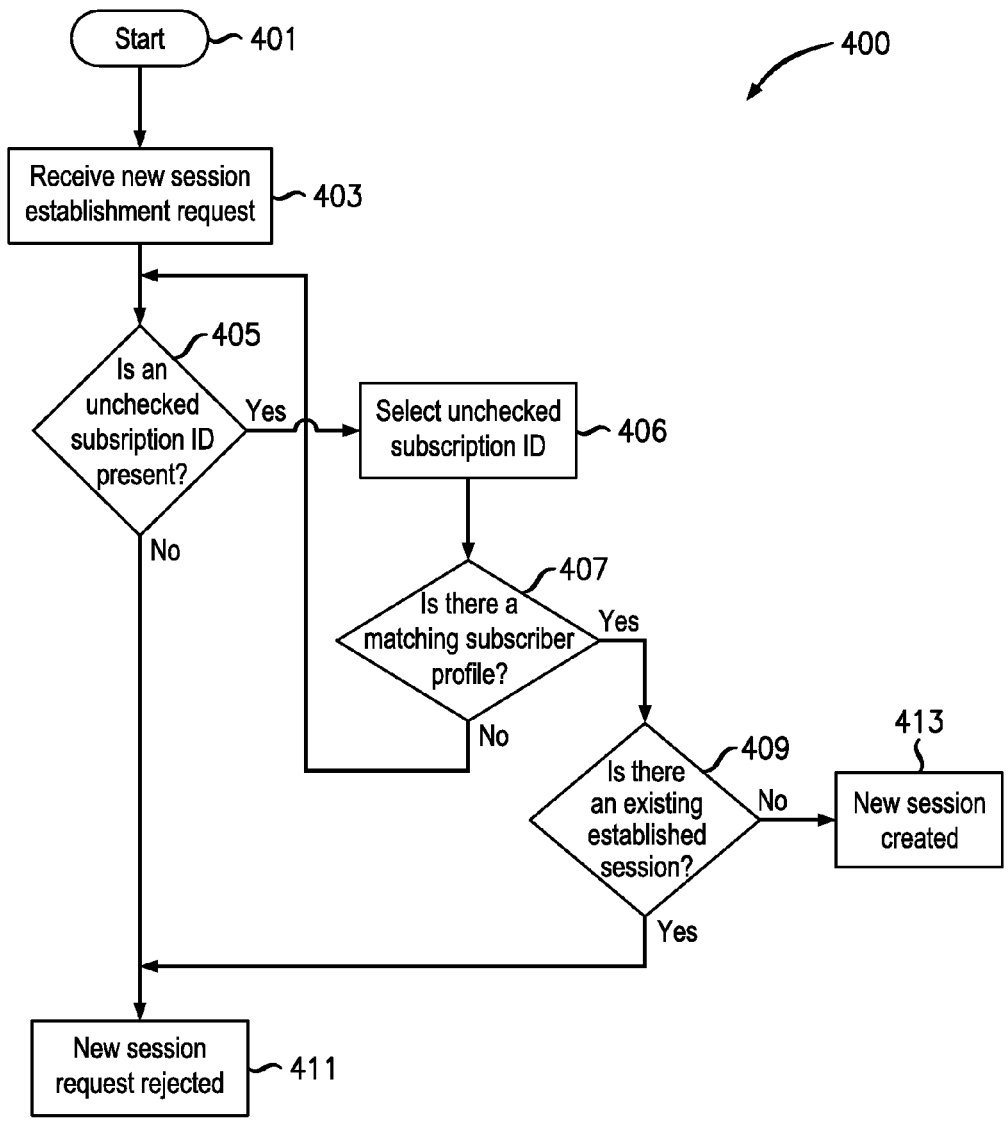
FIG. 4 illustrates an exemplary method for establishing a new session created from a message received by the PCRN.

Referring now to FIG. 4, an exemplary method performed by the PCRN 202 for handling a session upon a receipt of a message including subscriber information is illustrated. When the PCRN 202 receives a message from the AN 201, PGW 203, P-SGW 204, or SGW 205, the message may trigger a new session establishment request. PCRN 202 may employ method 400 to determine whether to establish a new session based on the request or to reject the establishment request. In some embodiments, the rejection of the new establishment request may lead to binding of sessions together.

Method 400 begins at steps 401-403, where the PCRN 202 may receive a new session establishment request from an incoming message via the Rx, Gx, or Gxx interface. If the message is received from a service gateway (P-SGW 204 or SGW 205) via the Gxx interface, the new session establishment request may be for a new gateway control session. If the message is received from a packet data network gateway PGW 203 via the Gx interface, the new session request may be for a new IP-CAN session. If the message received is from an application node AN 201 via the Rx interface, the new request may be for a new application (Rx) session. PCRN 202 may then proceed to steps 405-413, where the PCRN 202 may first determine whether the message contains an SBI that includes at least one subscription ID, when at least one subscription ID is present, check the included subscription ID(s) against information in the SPR 206 to determine whether there is already an existing session that fully or partially matches the information for the session specified in the request.

Following the receipt of the new session establishment request, in step 405, the PCRN 202 may determine if the SBI of an incoming message contains at least one subscriber ID. In some embodiments, when there is not at least one subscriber ID present, the PCRN 202 may proceed to step 411, where the PCRN 202 rejects the new session establishment request, as the request is deemed invalid. When there is at least one subscriber ID in the SBI, the PCRN 202 may in step 406, select one subscriber ID and in step 407, compare the subscriber ID against information included in subscriber records in the SPR 206. If the subscriber ID does not match any of the included subscriber records, the PCRN 202 may return to step 205 and determine if there are any additional subscriber IDs to compare.

When the PCRN 202 in step 407 determines that there is a subscriber record that includes the selected subscriber ID, the PCRN 202 in step 409 may determine if any existing established sessions are also related to the matching subscriber record. When the PCRN 202 finds a matching existing established session, this may indicate that the existing established session and the new message relate to the same subscriber. In this instance, the PCRN 202 in step 411 may reject the new session establishment request, rather creating an applicable session bound to the existing established session. Otherwise, when no existing established session is found, the PCRN 202 in step 413 may fulfill the new establishment request. The new establishment may include establishing a new IP-CAN session, even when the request was for the establishment of another request, such as an Rx or Gxx session.

For example, if a Gxx session (and related IP-CAN session) for MSG2 of FIG. 2 is already established, the receipt by the PCRN 202 of MSG1 may not result in the establishment of a new IP-CAN session for the Rx session. Rather, upon determining that MSG1 and MSG2 relate to the same subscriber, the PCRN 202 may create a new Rx session in the existing established IP-CAN session and may bind the Rx session to the existing established Gxx session.

Figure 5A:
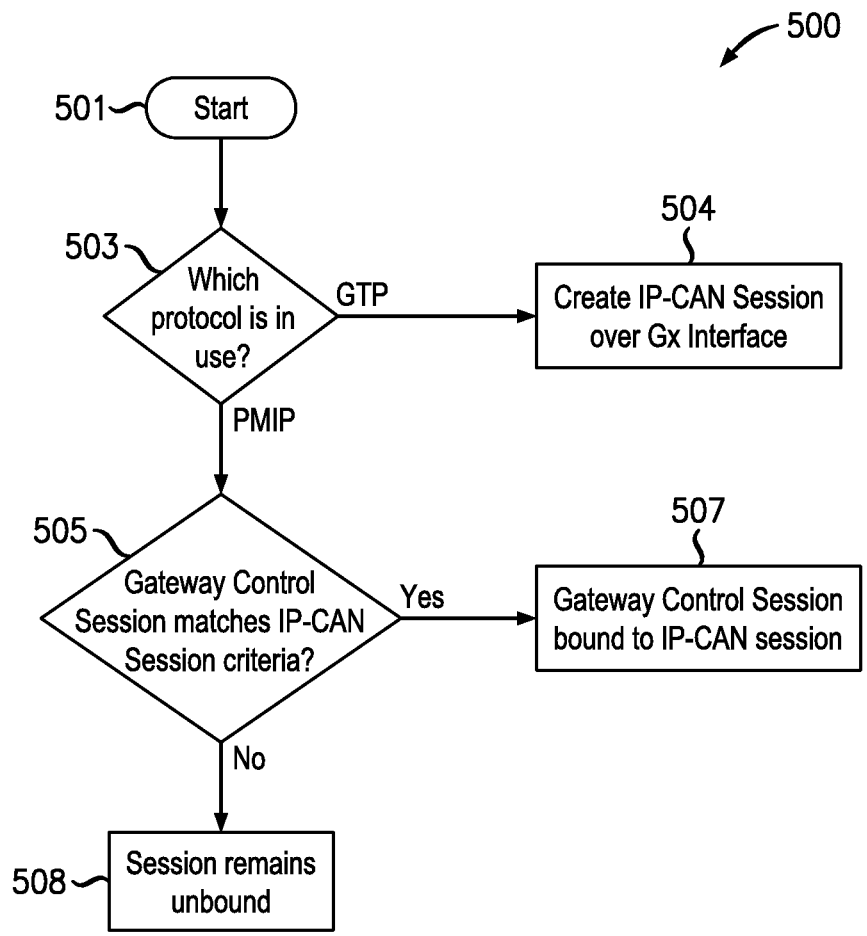
FIG. 5A illustrates an exemplary method for binding an IP-CAN session with a primary gateway from a plurality of gateways.

Referring now to FIG. 5A, an exemplary method of binding gateway sessions is illustrated. The PCRN 202 may employ method 500 to bind a gateway control session related to a service gateway (P-SGW 204, SGW 205) and an IP-CAN session related to a PGW 203. Depending on the protocol in use, the service gateways may not be in communication with the PCRN. Method 500 start at step 501 and proceeds to step 503, where the PCRN 202 may first determine the type of communications protocol in use. If the protocol in use is the GPRS tunneling protocol (GTP), then the PGW 203 is the only gateway in communications with the PCRN 202. PCRN 202 therefore may proceed to step 504, where the PCRN 202 may create an IP-CAN session via the Gx interface.

If, however, the protocol in use is PMIP, then both the PGW 203 and the service gateways 204, 205 may be in communications with the PCRN 202. In the PMIP case, there may be only one IP-CAN session, while there may be a plurality of gateway control sessions that are created by one or more service gateways 204, 205. The PCRN 202 may therefore attempt to appoint one of plurality of service gateways 204, 205 as the primary gateway 204, while the other gateways 205 may be either non-primary or backup gateways. The PCRN 202 may base the assignment of the primary gateway 204 on the best match with the IP-CAN session according to the attributes of the SBIs that created for the respective IP-CAN and gateway control sessions. For example, an IP-CAN session associated with PGW 203 may be bound to both a first gateway control session (GWC1) associated with non-primary gateway 205 and a second gateway control session (GWC2) associated with a primary gateway 204. The IP- CAN session may be bound to both, but has the second gateway control session GWC2 designated as the primary control session.

Accordingly, in step 505, the PCRN 202 may check the SBI of the gateway control session against the SBI of the IP-CAN session. This may be similar to the method 400 employed by PCRN 202 to determine if two subscription IDs in the SBI refer to the same subscriber. However, in step 505, the information in the SBI must match (i.e., the subscription IDs belong to same subscriber) in order to for the sessions to be bound (as will be discussed below, this may be similar to the matching criteria method employed in relation to FIG. 6). If the potential gateway control session matches the SBI of the IP-CAN session, the PCRN 202 may then proceed to step 507, where the gateway control session may be bound to the IP-CAN session, with a record of the binding being stored, for example, in a database in the PCRN 202. If the gateway control session does not match all the criteria of the IP-CAN session, then in step 508, the PCRN 202 may create the new session in the database, but the new session may remain unbound to an IP-CAN session until a suitable match to an IP-CAN session is found.

Figure 5B:
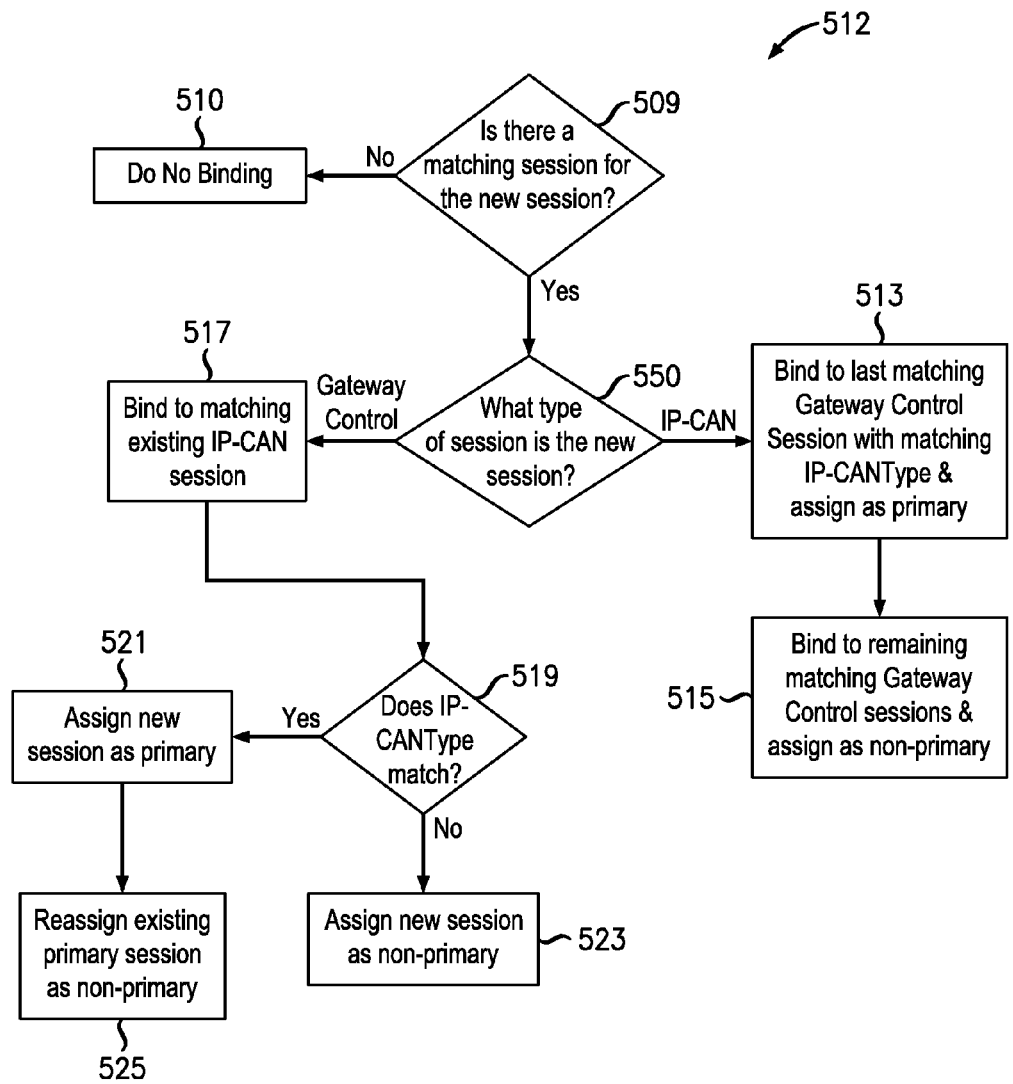
FIG. 5B illustrates an exemplary method for binding a new IP-CAN session or gateway control session to an matching established session.

Referring now to FIG. 5B, a related method of the PCRN 202 binding new IP-CAN sessions and gateway control sessions to suitable matches is illustrated. If either a new IP-CAN session or new gateway session is created, PCRN 202 may employ method 512 to bind matching existing sessions to it. The new session may also involve reassignment of one or more gateway control sessions as either primary or non-primary/backup. After receiving a new session, in step 509, the PCRN 202 may determine if there is a matching session for the newly-established session. This may involve steps similar to those discussed above in relation to FIG. 5A, matching, for example, a unique subscriber identity. If there is no matching session, the PCRN 202 may proceed to step 510, where the new session is established in the database, but the session may remain unbound until a suitable match to an IP-CAN session is found.

When a new session is being established, the PCRN 202 in step 511 may determine the type of new session being established. When, for example, a new IP-CAN session is being established, method 512 may proceed to step 513, where the new IP-CAN session may bind to a plurality of candidate gateway control sessions that all match the SBI of the new IP-CAN session. From this plurality of candidate gateway control sessions, the gateway control session that both matches the SBI of the IP-CAN session and also has the same IP-CANType as the request establishing the new IP-CAN session may be bound by the PCRN 202 as the primary gateway control session, with the record of the binding being stored in the database. If there is a plurality of gateway control sessions that both have matching criteria and IP-CANType to the new IP-CAN session, the new IP-CAN session may assign as primary the gateway control session that was created last. Subsequently, in step 515, the other gateway control sessions that match the criteria of the new IP-CAN session may also be bound to the new IP-CAN session by the PCRN 202, with the record of the binding being stored in the database.

Returning to step 511, if a new gateway control session is being established, the PCRN 202 in step 517 may bind the new gateway control session to an existing IP-CAN session that has matching attributes, while recording the binding in the database. In step 519, the PCRN 202 may then check the IP-CANType of the request establishing the new gateway control session to determine if it matches the IP-CANType of the matching IP-CAN session. If there is a match, the PCRN 202 may then in step 521 assign the new gateway control session as the primary. Next, in step 525, the PCRN may then reassign any previously-primary gateway control session as a non-primary/backup gateway control session, recording the reassignment in the database. However, if at step 519, it is found that the IP-CANType of the new gateway control session and the IP-CAN session do not match, then at step 525, the new gateway control session may be bound to the IP-CAN session by the PCRN 202 as a non-primary gateway.

Figure 6:
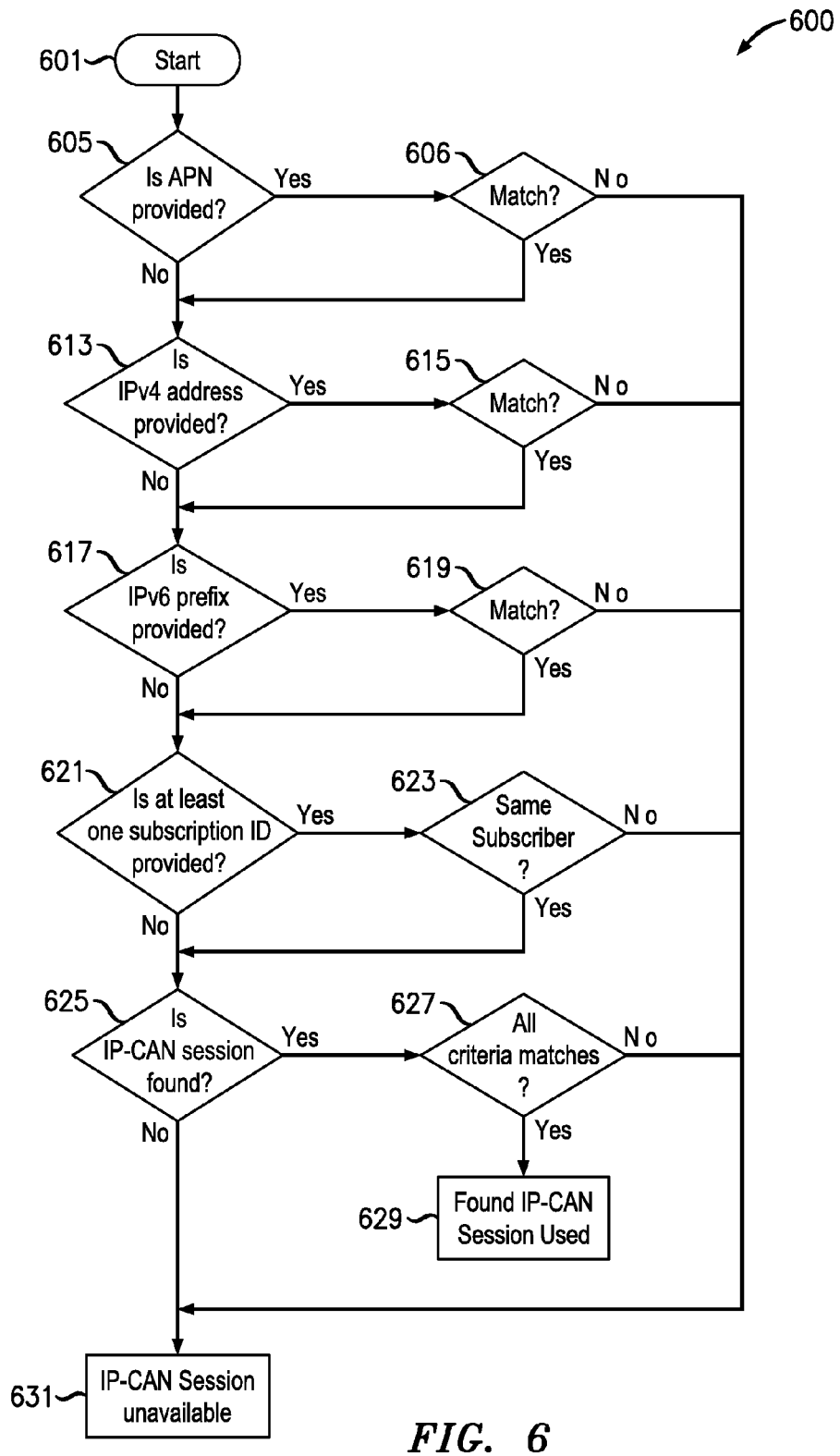
FIG. 6 illustrates an exemplary method for binding a session established by an application node (AN) with an IP-CAN session established by a packet data network gateway (PGW).

Referring now to FIG. 6, an exemplary method for binding an application session to an IP-CAN session is illustrated. Application sessions established by application node (AN) 201 may be bound to an IP-CAN session. The PCRN 202 may employ method 600 to use the SBI attributes of the incoming message to match with an established IP-CAN session. Similar to method 400 in FIG. 4, if all the available attributes match the SBI of the IP-CAN session, the PCRN 202 may proceed to step 629, where the application session is bound to the matching IP-CAN session found by the PCRN 202. Otherwise, if any of the available attributes from the SBI of the application session do not match the criteria of the target IP-CAN session, the PCRN 202 may proceed to step 631, where the target IP-CAN session may be unavailable for binding.

In steps 605-606, the PCRN 202 may determine whether the SBI contains an APN and compare the APN of the application session with the APN of the target IP-CAN session to see if they match. If the APNs of the application session and the APN of the IP-CAN session match, or if there is no available APN for the application session, the PCRN 202 may proceed to step 613, where it may examine another potential SBI attribute in the application session For example, in steps 613-615, it may determine whether matching IPv4 addresses are provided, and in steps 617-619, determine whether matching IPv6 prefixes are included. If the available APN in the application session does not match the APN of the IP-CAN session, then the PCRN 202 may proceed to step 631, where the sessions remain unbound.

In step 621, the PCRN 202 may check the one or more subscription IDs of the application session. Instead of ensuring that the subscription IDs match, the PCRN 202 may act in a way similar to step 423, where the PCRN 202 may ensure that the subscriber associated with the subscription ID of the application session also is associated with the subscription ID of the IP-CAN session. Similar to the previous steps, if the subscriber matches, then the PCRN 202 may proceed to step 625; if the subscriber does not match, then the sessions are not bound together.

In step 625, the PCRN 202 may ensure again that a matching IP-CAN session is found as a target for binding. If one is found, in step 627, the PCRN 202 again may ensure that all available attributes in the SBI of the application session matches the applicable criteria in the IP-CAN session. If the attributes match, the PCRN 202 may then proceed to step 629, where the target IP-CAN session is used and bound to the application session. If the criteria do not match or if a matching IP-CAN session is not found, then the PCRN 202 may proceed to step 631, where the PCRN 202 does not bind the application session with the target IP-CAN session.

According to the foregoing, various exemplary embodiments provide for dynamic association of messages from diverse sources when received by the PCRN. Particularly, by comparing available subscription IDs of session binding identifiers (SBIs) included in each incoming message, the PCRN may refer to a subscriber database and may associate messages and their applicable sessions together within the PCRN.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable medium encoded with instructions for execution by a policy and charging rules node, the medium comprising:
   instructions for processing requests for Internet Protocol-Connectivity Access Network (IP-CAN) sessions, including:
      instructions for establishing an IP-CAN session based on a received request for an IP-CAN session,
      instructions for retrieving a subscription profile based on an identifier of a first type carried by the request for IP-CAN session, and
      instructions for associating the retrieved subscription profile with the established IP-CAN session; and
   instructions for processing requests for sessions of a type that is different from an IP-CAN session, including:
      instructions for determining whether an identifier of a second type carried by a request for a session of the type that is different from an IP-CAN session is associated with the retrieved subscription profile, and
      instructions for conditionally establishing the session of the type that is different from an IP-CAN session based on the determination by the instructions for determining.

2. The non-transitory machine-readable medium of claim 1, wherein the instructions for determining whether an identifier of a second type carried by a request for a session of the type that is different from an IP-CAN session is associated with the retrieved subscription profile comprise:
   instructions for retrieving the subscription profile based on the identifier of the second type; and
   instructions for determining that the subscription profile is associated with the established IP-CAN session.

3. The non-transitory machine-readable medium of claim 1, wherein the instructions for retrieving a subscription profile based on an identifier of a first type carried by the request for IP-CAN session comprise instructions for retrieving the subscription profile from an external subscription profile repository (SPR).

4. The non-transitory machine-readable medium of claim 1, further comprising instructions for associating the session of the type that is different from an IP-CAN session with the IP-CAN session based on the identifier of the first type and the identifier of the second type being associated with the same subscription profile.

5. The non-transitory machine-readable medium of claim 1 wherein the sessions of a type that is different from an IP-CAN session comprise at least one of a gateway control session and an application function (AF) session.

6. The non-transitory machine-readable medium of claim 1, wherein the instructions for conditionally establishing the session of the type that is different from an IP-CAN session based on the determination by the instructions for determining comprise:
   instructions for rejecting the request for a session of the type that is different from an IP-CAN session based on determining that the identifier of the second type is not associated with a subscription profile associated with an IP-CAN session.

7. The non-transitory machine-readable medium of claim 1, wherein the instructions for retrieving a subscription profile based on an identifier of a first type carried by the request for IP-CAN session and the instructions for determining whether an identifier of a second type carried by a request for a session of the type that is different from an IP-CAN session is associated with the retrieved subscription profile comprise:
   instructions for identifying at least one identifier available within a received request regardless of request type; and
   instructions for retrieving a subscription profile associated with the at least one identifier that is available within the received request.

8. A method performed by a policy and charging rules node, the method comprising:
   processing requests for Internet Protocol-Connectivity Access Network (IP-CAN) sessions, including:
      establishing an IP-CAN session based on a received request for an IP-CAN session,
      retrieving a subscription profile based on an identifier of a first type carried by the request for IP-CAN session, and
      associating the retrieved subscription profile with the established IP-CAN session; and
   processing requests for sessions of a type that is different from an IP-CAN session, including:
      determining whether an identifier of a second type carried by a request for a session of the type that is different from an IP-CAN session is associated with the retrieved subscription profile, and
      conditionally establishing the session of the type that is different from an IP-CAN session based on the determination.

9. The method of claim 8, wherein determining whether an identifier of a second type carried by a request for a session of the type that is different from an IP-CAN session is associated with the retrieved subscription profile comprises:
   retrieving the subscription profile based on the identifier of the second type; and
   determining that the subscription profile is associated with the established IP-CAN session.

10. The method of claim 8, wherein retrieving a subscription profile based on an identifier of a first type carried by the request for IP-CAN session comprises retrieving the subscription profile from an external subscription profile repository (SPR).

11. The method of claim 8, further comprising associating the session of the type that is different from an IP-CAN session with the IP-CAN session based on the identifier of the first type and the identifier of the second type being associated with the same subscription profile.

12. The method of claim 8, wherein the sessions of a type that is different from an IP-CAN session comprise at least one of a gateway control session and an application function (AF) session.

13. The method of claim 8, wherein the conditionally establishing the session of the type that is different from an IP-CAN session based on the determination comprises:
  rejecting the request for a session of the type that is different from an IP-CAN session based on determining that the identifier of the second type is not associated with a subscription profile associated with an IP-CAN session.

14. The method of claim 8, wherein the retrieving a subscription profile based on an identifier of a first type carried by the request for IP-CAN session and the determining whether an identifier of a second type carried by a request for a session of the type that is different from an IP-CAN session is associated with the retrieved subscription profile both comprise:
  identifying at least one identifier available within a received request regardless of request type; and
  retrieving a subscription profile associated with the at least one identifier that is available within the received request.

15. A policy and charging rules node (PCRN) comprising:
  a network interface;
  a memory; and
  a processor in communication with the network interface and memory, the processor being configured to:
  process requests for Internet Protocol-Connectivity Access Network (IP-CAN) sessions received via the network interface, including:
    establishing an IP-CAN session based on a received request for an IP-CAN session,
    retrieving a subscription profile based on an identifier of a first type carried by the request for IP-CAN session, and
    associating the retrieved subscription profile with the established IP-CAN session; and
  process requests for sessions of a type that is different from an IP-CAN session received via the network interface, including:
    determining whether an identifier of a second type carried by a request for a session of the type that is different from an IP-CAN session is associated with the retrieved subscription profile, and
    conditionally establishing the session of the type that is different from an IP-CAN session based on the determination.

16. The PCRN of claim 15, wherein, in determining whether an identifier of a second type carried by a request for a session of the type that is different from an IP-CAN session is associated with the retrieved subscription profile, the processor is configured to:
  retrieve the subscription profile based on the identifier of the second type; and
  determine that the subscription profile is associated with the established IP-CAN session.

17. The PCRN of claim 15, wherein, in retrieving a subscription profile based on an identifier of a first type carried by the request for IP-CAN session, the processor is configured to retrieve the subscription profile from an external subscription profile repository (SPR).

18. The PCRN of claim 15, wherein the processor is further configured to associate the session of the type that is different from an IP-CAN session with the IP-CAN session based on the identifier of the first type and the identifier of the second type being associated with the same subscription profile.

19. The PCRN of claim 15, wherein the sessions of a type that is different from an IP-CAN session comprise at least one of a gateway control session and an application function (AF) session.

20. The PCRN of claim 15, wherein, in the conditionally establishing the session of the type that is different from an IP-CAN session based on the determination, the processor is configured to:
  reject the request for a session of the type that is different from an IP-CAN session based on determining that the identifier of the second type is not associated with a subscription profile associated with an IP-CAN session.

\* \* \* \* \*